US010635416B2

(12) United States Patent
Adams et al.

(10) Patent No.: US 10,635,416 B2
(45) Date of Patent: Apr. 28, 2020

(54) PROPERTY FILTERING

(71) Applicant: Microsoft Technology Licensing, LLC, Redmond, WA (US)

(72) Inventors: Samuel David Adams, Bellevue, WA (US); Jonathan Wiswall, Woodinville, WA (US); Neil Sandlin, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/279,278

(22) Filed: Feb. 19, 2019

(65) Prior Publication Data

US 2020/0042297 A1 Feb. 6, 2020

Related U.S. Application Data

(60) Provisional application No. 62/712,960, filed on Jul. 31, 2018.

(51) Int. Cl.
*G06F 8/41* (2018.01)
*G06F 8/75* (2018.01)

(52) U.S. Cl.
CPC ............... *G06F 8/437* (2013.01); *G06F 8/75* (2013.01)

(58) Field of Classification Search
None
See application file for complete search history.

(56) References Cited

U.S. PATENT DOCUMENTS 7,478,163 B2 1/2009 Aida et al.
7,730,495 B2 6/2010 Kothari et al.
(Continued)

FOREIGN PATENT DOCUMENTS

WO 2013022465 A1 2/2013

OTHER PUBLICATIONS

"About Info.plist Keys and Values", Retrieved From: https://developer.apple.com/library/archive/documentation/General/Reference/InfoPlistKeyReference/Introduction/Introduction.html, Retrieved Date: Jan. 28, 2019, 3 Pages.
(Continued)

*Primary Examiner* — Philip Wang
(74) *Attorney, Agent, or Firm* — Newport IP, LLC; Han Gim

(57) ABSTRACT

A framework is defined for property-based filtering for objects. The framework is independent of specific programming languages. Selection criteria is entered to match on the selected criteria and allow for searching for objects. Properties for objects are exposed as property sets and language specific projections of properties. The framework codifies strongly typed properties and property sets, projecting property sets generically on language specific objects, and a generic Boolean filtering system on objects or property sets. The framework defines property keys with type, property values, property expressions, and property filters which are a collection of property expressions which can be applied against property sets, property handlers, and language-specific projections of generic objects. The framework also includes a generic object programming model where objects expose a common interface whereby generic property filters can be evaluated against any object.

20 Claims, 8 Drawing Sheets

(56) References Cited

U.S. PATENT DOCUMENTS

| | | | |
|---|---|---|---|
| 8,271,939 B1* | 9/2012 | Krishnaiyer | G06F 8/33 707/795 |
| 8,296,730 B2 | 10/2012 | Whitechapel et al. | |
| 9,135,585 B2 | 9/2015 | Bader et al. | |
| 9,201,637 B1 | 12/2015 | Kvinge et al. | |
| 2002/0108102 A1 | 8/2002 | Muhlestein et al. | |
| 2006/0195477 A1* | 8/2006 | Deem | G06F 16/252 |
| 2009/0055366 A1* | 2/2009 | Smith | G06F 16/835 |
| 2009/0234804 A1 | 9/2009 | Whitechapel et al. | |
| 2013/0042258 A1* | 2/2013 | Rector | G06F 8/51 719/328 |
| 2014/0074833 A1* | 3/2014 | Adams | G06F 16/28 707/736 |
| 2014/0074885 A1* | 3/2014 | Adams | G06F 16/903 707/776 |
| 2014/0310313 A1* | 10/2014 | Adams | G06F 16/78 707/776 |
| 2015/0149981 A1* | 5/2015 | Adams | G06F 8/36 717/106 |
| 2019/0332693 A1* | 10/2019 | Vandenbrouck | G06F 16/288 |

OTHER PUBLICATIONS

"Advanced Query Syntax", Retrieved From: https://docs.microsoft.com/en-us/windows/desktop/lwef/-search-2x-wds-agsreference, May 31, 2018, 11 Pages.

"Strongly Typed Properties in Java vs C#", Retrieved From: http://programmaticallyspeaking.com/strongly-typed-properties-in-java-vs-c.html, Jan. 19, 2012, 5 Pages.

"Non-Provisional Application Filed in U.S. Appl. No. 15/865,174", filed Jan. 8, 2018, 93 Pages.

Strahl, Rick, "Creating a Dynamic, Extensible C# Expando Object", Retrieved From: https://weblog.west-wind.com/posts/2012/Feb/08/Creating-a-dynamic-extensible-C-Expando-Object, Feb. 8, 2012, 27 Pages.

"Smart Completion—Help | ReSharper", Retrieved From: https://web.archive.org/web/20180714110447/https://www.etbrains.com/help/resharper/Coding_Assistance__Code_Completion__Smart.html, Retrieved date: Jul. 14, 2018, 5 Pages.

"International Search Report and Written Opinion Issued in PCT Application No. PCT/US19/038070", dated Sep. 10, 2019, 15 Pages.

* cited by examiner

PROPERTY FILTERING

PRIORITY APPLICATION

This application claims the benefit of and priority to U.S. Provisional Application No. 62/712,960, filed Jul. 31, 2018, the entire contents of which are incorporated herein by reference.

BACKGROUND

In many programming frameworks, it is typical for applications and services to enumerate, manually search, and access a subset of matching objects. These objects may represent data, or system resources, such as files or an on-device sensor. However, many frameworks do not provide a standardized or generalized way to execute such searches. As a result, developers must often implement their own search logic. Some frameworks may allow for using a string to search for properties and property sets. When objects are searched for using string-based property sets, the property sets must be entered manually, which may result in performance and scalability problems which can sometimes be untenable. Furthermore, discoverability can be difficult and unpredictable.

These shortcomings can be inconvenient for users and cause significant inefficiencies with respect to the utilization of computing resources. For example, filtering using a string can result in the properties being searched multiples times, further resulting in inefficient utilization of processor cycles, memory, battery power, and network bandwidth. Similarly, ineffective manual filtering can lead to significant rework and delays due to manual updating, leading to inefficient computer interactions that increase the frequency of inadvertent or erroneous user inputs which, in turn, cause further inefficiencies with respect to the utilization of computing resources. Given these drawbacks and others, there still exists a need for tools that can provide a standard property projection interface for filtering for devices and other objects.

It is with respect to these and other technical challenges that the disclosure made herein is presented.

SUMMARY

In many programming frameworks, the concept of "property" is a basic building block. A property generally consists of an identity and a value. Properties may be exposed in two ways: a "property set" which may be a collection of properties, and language specific projections of properties based on objects. The present disclosure describes various techniques for efficient object filtering. In some embodiments, a strongly typed implementation is provided rather than using strings. Embodiments include systems and methods that codify strongly typed properties and property sets, a framework for projecting property sets generically on language specific objects, and a generic Boolean algebra-based filtering system on objects or raw property sets. For example, in one embodiment, a standard {string id, value} map for property sets may be implemented. Additionally, techniques for generic language property set projections are disclosed that enable generic object filtering. The disclosure thus defines a framework for property-based filtering for objects that is independent of specific programming languages.

In one embodiment, selection criteria can be entered to match on the selected criteria and allow for searching for objects. Properties for objects may be exposed as property sets and language specific projections of properties. The framework defines property keys, property values, property logical expressions (e.g., exp=key foo<4), and property filters which are a collection of property expressions that can be applied against property sets, property handlers, and language-specific projections of generic objects.

The techniques disclosed herein can improve user interaction with a computing device, which can increase productivity and help reduce the number of inadvertent, obsolete, or otherwise incorrect inputs. Also, by providing more accurate and efficient filtering, a system can operate more efficiently with respect to the use of memory, processing resources, network resources, etc. Other technical effects other than those mentioned herein can also be realized from implementations of the technologies disclosed herein.

BRIEF DESCRIPTION OF THE DRAWINGS

The Detailed Description is described with reference to the accompanying figures. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
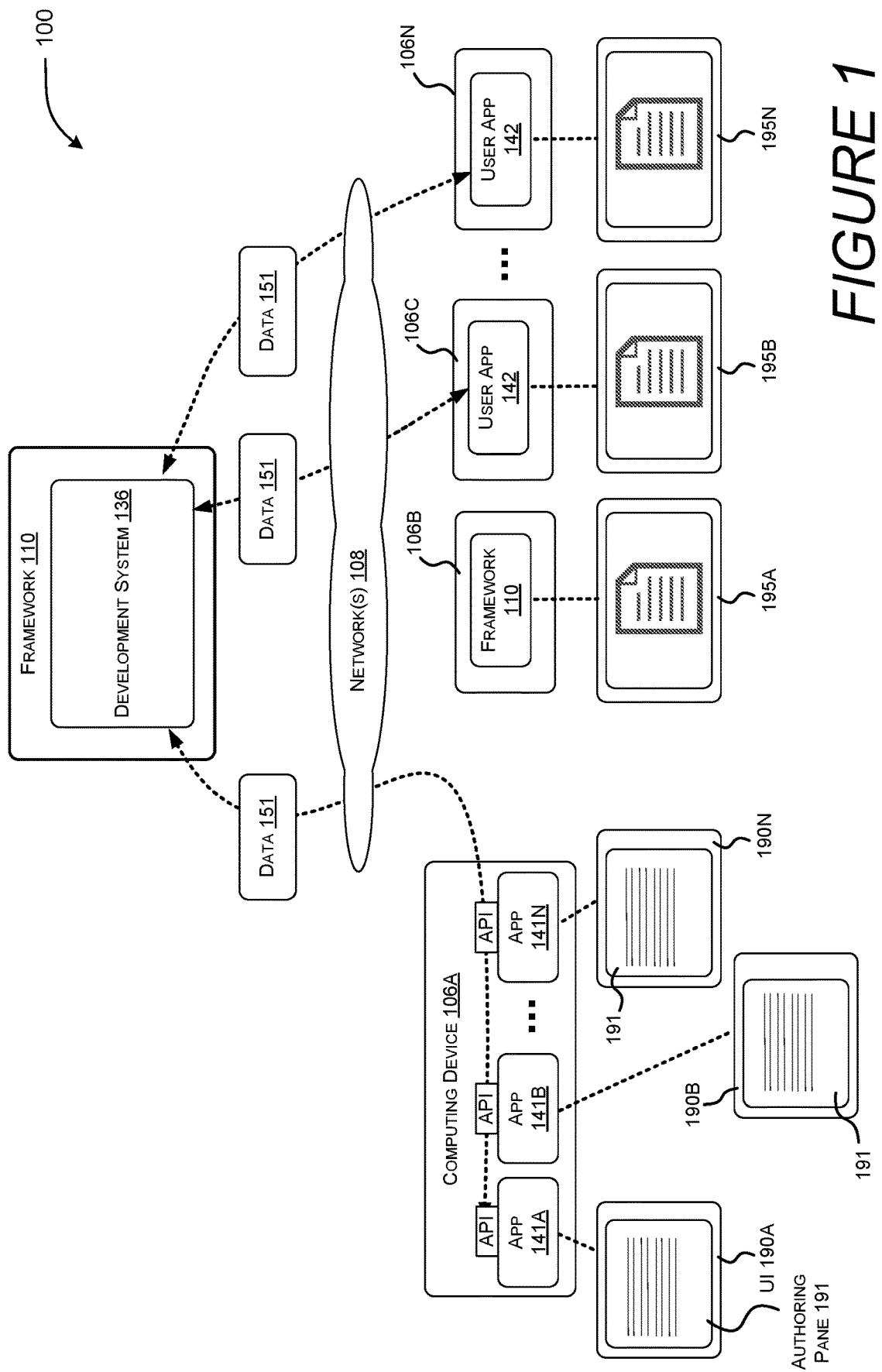
FIG. 1 illustrates a diagram illustrating an example system according to various embodiments.

Described herein are systems and methods for a strongly typed system for object filtering, including generic language property set projections that enable generic object filtering. The described embodiments address issues with the use of strings for property keys that can result in poor discoverability. For example, developers often need to perform manual operations, such as having to find properties in documentation and copy them into their project. Additionally, strings may be error prone, especially for property keys and selectors. For example, an off-by-one-character typo is easy to make. Code with such errors may compile, but will not work as intended and can be difficult to debug. Furthermore, strings are not extensible as runtime classes are. For example, it would not be possible to add new functionality to some parameters. The use of strings may thus lead to architectural limitations.

Additionally, strings are not strongly typed. For example, a developer can pass in any string value to an application binary interface (ABI) that accepts string parameters, which can be a problem even under normal circumstances. For example, if an ABI receives a Globally Unique Identifier (GUID) as a string parameter, it may be difficult or impossible to determine which format is correct. For example, it will be difficult or impossible to determine which of the following is correct: "0649c479-bffe-43ef-985b-22ed797b4437", "10649c479-bffe-43ef-985b-22ed797b44371", or "{0x0649c479, 0xbffe, 0x43ef, {0x98, 0x5b, 0x22, 0xed, 0x79, 0x7b, 0x44, 0x37}}." Case sensitivity and other issues would also have to be determined. In many cases, selector complexity may make it difficult to build a syntactically correct selector. Performance may also be an issue due to the required decoding of the property key strings and selectors.

Systems and methods for strongly typed property keys and property selectors are disclosed herein to address the above noted issues. The use of strongly typed property keys and property selectors may allow for allowing the keys to be discoverable without searching documentation while reducing developer errors and allowing for the building of selectors. For ABI implementers, the use of strongly typed property keys and property selectors may thus allow for improved performance and extensibility.

Systems and methods are also disclosed to enable generic language property set projections that enable generic object filtering. Projection of properties refers to the framework taking generic objects and performing a universal or generic projection of properties of those objects and exposing them as property sets such that the framework filtering system can work generically on any object in the framework. Projection is an automated way of exposing a filter role object or filter role property set generically based on any object framework.

In an embodiment, a computing environment that implements strongly typed property keys and property selectors may be implemented using one or more components. In one embodiment, the components may execute on the same physical computing device. In other embodiments, the components may be distributed, for example in a client-server architecture.

In one embodiment, projections can be implemented where an object's interface defines object properties. The framework may automatically project them as a property set interface or as an opt in. The implementer of the object may also implement the IPropertySet interface. If an object implements IPropertySet, then a filter can evaluate the object. The framework also includes a generic object programming model where objects expose a common interface whereby generic property filters can be evaluated against any object.

In various embodiments, the following may be defined:
1. property keys with type, e.g. {{namespace_guid}, property_id}, variant_type}
2. property values, e.g. {variant_type, value_data}
3. properties {property key, property value}
4. property expressions {property, operator, value}
5. property filters, a collection of property expressions grouped together with operators with arbitrary complexity, e.g. (AND (ex1, NOT(ex2), OR(ex3, ex4))
    a. against property sets
    b. against property handlers
    c. against language projections of generic objects
6. a generic object programming model where at least a subset of objects expose a common interface whereby generic property filters can be evaluated against any object.

FIG. 1 illustrates a system 100 for enabling the generation, storage, and updating of property keys and property selectors from multiple applications 141 and 142. In this example, a user can interact with an individual application 141 or 142 to create and edit property keys and property selectors. The applications 141 and 142 may each configured to display an authoring pane 191. The content of each file or program is displayed in the authoring pane 191. A user can select portions of content displayed in the authoring pane 191.

A computing device 106A may be configured to interact with a framework 110 and development system 136 to develop or use property keys and property selectors.

Data 151 can include text or any other form of data. The data 151 can include portions of programming data that is developed within framework 110 including development system 136.

The data 151 can be communicated to/from any number of computing devices 106, referred to herein as computing devices 106B-106N, from a first computing device 106A or the framework 110 via a network 108. Each computing device 106B-106N associated with a recipient can display the data 151 on a user interface 195 (195A-195N) by the use of a user application 142. The user application 142 can be any suitable application such as a text editor, programming application, etc.

While FIG. 1 shows a cloud-based implementation, the framework 110 and development system 136 may be implemented locally on a single device. For example, computing device 106B is shown as running framework 110 locally. In one embodiment, the described framework can be implemented on a single compute device. The frameworks may be implemented on the device, expose objects that represent data, and system resources. The framework can expose APIs as well.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, which improves other computing resources such as processor and network resources, e.g., improved filtering may reduce the chance of an inadvertent input, reduce network traffic, and reduce computational cycles. Other technical effects other than those mentioned herein can also be realized from implementations of the technologies disclosed herein.

In the present disclosure, some example implementations are described in terms of an example scenario such as the context of the Windows Runtime (WinRT) application architecture. The described principles may be applied to other architectures and platforms.

The concepts of properties with keys, values, and sets are basic building blocks for many APIs. In one embodiment, these are defined as HSTRINGs for property keys, PropertyType, PropertyValue, and PropertySet/ValueSet runtime classes. Another is the property key runtime class as further described herein.

The concept of "selector" is more specialized, but also builds on these property building blocks. A selector uses property keys and property values combined with logical operators to build complex logical expressions to execute on a property set. For example, (prop_a==1||prop_b>5) evaluates true if the property set has property b==6.

One commonality between property selectors and property keys in some implementations is that they are both represented using strings. A new application programming interface (API) may be implemented that moves away from string-based property keys and property selectors to strongly typed runtime classes PropertyKey and PropertySelector which may be property runtime class primitives similar to PropertyType, PropertyValue, etc. Specialized stacks can use these classes to overcome string limitations.

In one embodiment, a property may be a generic key value pair:
PropertyKey: The ID of a property consisting of a {namespace_guid, id, type} tuple
PropertyValue: Is a variant that holds one value of one of several different types (e.g. string, UInt32)
Property Set: A collection of key+value pairs, may be referred to as property bags or value sets
Selector: A property based logical expression applied to a property set.
Advanced Query Syntax (AQS) is an implementation of "selector" developed originally for the shell.

Property keys may be used down from the kernel and up to the shell and 3rd party applications. In one embodiment, property keys may be basic C structures consisting of a {GUID, PID}. An API may introduce PropertyKey, a new runtime class for the basic concept of property key which consists of a GUID, PID, and type.

Additionally, well-known property keys may be exposed as properties of runtime classes representing property key groupings under a namespace. Making well-known property keys and runtime class properties accessible may improve discoverability and reduce developer errors. For example, a developer can obtain a device related property by typing Windows.Foundation.Properties.DevicePropertiess.ModelName, or a multimedia property key with Windows.Foundation.Properties.Audio.ChannelCount. In the second example, "Audio" is a runtime class with only properties, and "ChannelCount" is a [propget] method.

The following describes how property keys may be defined in one embodiment:
PROPERTYKEY & DEVPROPERTYKEY
COM/Shell PROPERTYKEY and device DEVPROPERTYKEY are both structurally a {{GUID}, PID}, and may be interchangeable. They differ in that DEVPROPKEY uses a more limited variant for property values.
// Ez.
DEFINE_PROPERTYKEY (PKEY_DeviceContainer_ModelName, 0x656A3BB3, 0xECC0, 0x43FD, 0x84, 0x77, 0x4A, 0xE0, 0x40, 0x4A, 0x96, 0xCD, 8194); //
VT_LPWSTR
// OR
DEFINE_DEVPROPKEY(DEVPKEY_DeviceContainer_ModelName, 0x656A3BB3, 0xECC0, 0x43FD, 0x84, 0x77, 0x4A, 0xE0, 0x40, 0x4A, 0x96, 0xCD, 8194); //
DEVPROP_TYPE_STRING (localizable)
// are functionally equivalent PropSys abstracts property keys into string-based IDs fortified with richer metadata. PropSys property keys are defined in a series of XML flies, typically one per namespace. To use one PropSys property key, PropSys.dll loads, and then it loads and parses the XML into DOMs building a property key metadata database. Then, PropSys allows a developer to query for properties using well-known string IDs and get additional information about them such as what type the property is. AQS builds on top of PropSys for decoding property keys.
<!-- ex. -->
<propertyDescription name="System.Devices.ModelName" formatID="{656A3BB3-ECC0-43FD-8477-4AE0404A96CD}" propID="8194"
   <description>Model name of the device.</description>
   <internalInfo group="Devices" owner="NeilSa" isPublic="true"/>
   <searchInfo reIndexPatterns=" " processReIndexPatternsImmediately="true"
inInvertedIndex="false" isColumn="false"/>
   <labelInfo label="Model"/>
   <typeInfo type="String" isInnate="true" isViewable="true"
canGroupBy="true"/>
   <displayInfo displayType="String"/>
</propertyDescription>

In some implementations, ABIs take strings as property keys. Well-known properties may be backed by PropSys. Generic properties may be defined using a generic "GUID PID" format which PropSys converts into a Win32 PROPERTYKEYs. Generic property keys do not specify a property type; therefore, property keys used in AQS selectors are well-known because AQS needs to know what property type the property key is supposed to be. Properties in property sets do not have to be well known. Implementations of PropertySet may use the generic string form of property keys.

Moving beyond property keys as strings, PropertyKey may be defined as a runtime class to avoid the issues of relying on strings as outlined above. In an embodiment, a class may comprise a namespace GUID, property ID, and property type. This is similar to property keys in other implementations, except property type is explicit and required.

PropertyKeys may be created by the developer in at least three ways: 1) constructing them from the basic constituent data, 2) constructing them from a PropSys string, and 3) using a propget method off of the new property namespace runtime classes. Well-known property keys may be received as properties off of helper runtime classes, or properties may be provided by the various ABIs in higher-level scenarios.
// Continuing the theme of using a well-known property key, the property key can be produced like this:
// a well-known key backed with a [propget] method
PropertyKey modelName=Windows.Foundation.Properties.DeviceProperties.ModelName;
// Or generated from a well-know PropSys property key string
PropertyKey modelName=new PropertyKey("System.Devices.ModelName");
// Or generated from a generic format PropSys property key string+property type
PropertyKey modelName=new PropertyKey("656A3BB3-ECC0-43FD-8477-4AE0404A96CD 8194", PropertyType.String);
// Or generic GUID+PID+type data
PropertyKey modelName=new PropertyKey(Guid (0x656A3BB3, 0xECC0, 0x43FD, 0x84, 0x77, 0x4A, 0xE0, 0x40, 0x4A, 0x96, 0xCD), 8194, PropertyType.String);

```
// Or from a Win32 PROPERTYKEY
ComPtr<IPropertyKey> modelName;
RETURN_IF_FAILED(MakeAnd Initialize<PropertyKey>
(&DEVPKEY_DeviceContainer_ModelName, Property-
Type::PropertyType_String, &modelName);
```

Well-known property keys may be exposed to developers through new runtime classes by [getproperty] methods. Each of these runtime classes may conceptually represent a property key "namespace." For example, the device ModelName property would be a property of the Device runtime class under the Windows.Foundation.Properties namespace. Likewise, ChannelCount could be a property of the "Audio" runtime class, under the Windows.Foundation.Properties.Multimedia namespace. Today, developers may have to discover PropSys property key strings through documentation pages or published samples. In contrast, these new runtime classes that expose property keys may provide advantages for developers in that they easily allow discovery of property keys in their integrated development environment (IDE) and may avoid typographical errors related to using opaque strings. For each property key that is to be easily publicly discovered, they may have their own propget method. In one embodiment, parity may be maintained with the property keys defined in PropSys's XML files.

```
// Eg.
PropertyKey modelName=Window.Foundation.Properties.
DeviceProperties.ModelName;
// or
auto requestedPropKeys=new PropertyKey[ ]{Properties.
DeviceProperties.ModelName, Properties.Multimedia.Au-
dio.ChannelCount};
```

PropertyKeys may by stringable to make them backwards compatible with HSTRING property keys. To standardize, they may always return a string in the generic "GUID PID" PropSys format.

```
// Eg.
String modelName=Windows.Foundation.Properites.Dev-
iceProperties.ModelName.ToString( );
// Will return "656A3BB3-ECC0-43FD-8477-4AE0404-
A96CD 8194"
```

Some APIs may return PropertySets. Property sets may generally be backed by IMap<HSTRING, IPropertyValue>. Property sets may also support IMap<PropertyKey, PropertyValue>; PropertyKey Property sets may by stringable, so its Property sets may be compatible with HSTRING based maps.

```
// Eg. This should continue to work for backwards comput-
ability
PropertyValue val=propSet[Properties.DeviceProperties.
ModelName.ToString( )];
// But, this should work too
PropertyValue val=propSet(Properties.DeviceProperties.
ModelName);
```

PropertySelector Property sets may be a generic implementation of a property based logical expression executed on a property set. It may be applicable for APIs that use PropertySets and obtain property set matching and filtering based on a selection criterion. PropertySelector may be used as is, or as a basic building block for more specialized implementations of selectors.

In an embodiment, a basic feature of a selector may be storing a logical expression. The logical expression can be simple (e.g., p1=5) or arbitrarily complex with nested logic (e.g., OR(AND(p1=2, p3>5), AND(p5=6, OR(p7=3, p7=1)), p=5)). Selectors may be provided to developers directly from various stacks. For example, if a developer needs Bluetooth devices that support a specific Bluetooth feature, the Bluetooth stack may provide a correctly crafted selector for matching device objects to that criterion. In more advanced cases, or in cases or scenarios where stacks don't exist to provide selector helpers, a developer may craft their own selector.

```
// eg. Getting an audio capture device selector from a deep
stack
PropertySelector selector=Windows.Media.Devices.
MediaDevice.GetAudioCaptureSelector( );
```

In an embodiment, PropertySelector provides a general-purpose selector builder for when developers need to generate their own selector from scratch, or add to a selector returned by a stack.

Selectors may be built additively. A developer may start with smaller expressions and AND and OR them with other expressions to build larger expressions. The following provides one example:

```
// Ez. AND{p5=6, OR(p7=3, p7=1)), p8=5)) could be built
this way
auto exp1=new PropertyExpression(p5, PropertyOperator.
Equals, PropertyValue.CreateInt32(6)};
auto exp2=new PropertyEzpression(p7, PropertyOperator.
Equals, PropertyValue.CreateInt32)(3)};
auto ezp3=new PropertyEzpression(p7, PropertyOperator.
Equals, PropertyValue.CreateInt32(1)};
auto ezp4=new PropertyEzpression(p8, PropertyOperator.
Equals, PropertyValue.CreateInt32(5)};
Property3elector sel=PropertySelector.CreatOr(new Proper-
tyEzpression[ ](exp2, exp3});
sel.And( . . . );
// CONSIDER:
new PropertySelector(Operator.Foo, myExpressions[ ])
new PropertySelector(Operator.Foo, selector1, selector2)
new PropertySelector(Operator.Bar, selector) // negation
PropertySelector.CreateOr/Etc. for jscript
```

PropertySelector provides a general-purpose selector evaluator for evaluating a property set against a selector. 3rd party developers may use this feature to directly test and filter object property sets against a selector retrieved from a stack, or self-built for their own custom scenario. It may also be used directly by ABIs to perform in-process filtering, or as a building block to build more advanced filtering scenarios using selectors. A developer may also provide a get property handler in lieu of or in addition to a PropertySet. Not all property values may be known up front, or some property values may be expensive to generate, so this allows postponing the cost only if they are needed. A handler gives the developer flexibility of how and when to produce property values.

Evaluation does not require all property values to produce a correct result. For example, if the selector is CAR(p1=4, p2=f, and p3=t), even if we only know from the property set that p3=4, this expression will still evaluate true. This may be useful because a user may not know p1 or p2.

Evaluation may perform short circuit style evaluation. For example, if the expression is OR(p1=t . . . ), if the property set has p1=t, logically there is no need to evaluate the rest of the expression, so the rest may be skipped.

In an embodiment, PropertySelector may provide support for creation from AQS strings, and AQS string generation. AQS selectors can be translated into PropertySelectors and back, but because AQS requires all property keys to be in PropSys and PropertySelector does not, it is possible to have a valid PropertySelector that cannot transform into AQS.

The following provide examples of using property keys with the Windows.System.User class.

```
Using Windows. Foundation;
private static String GetUserDisplayName(Windows.System.User user)
{
    // GetPropertyAsync supports PropertyKey
    return await user.GetPropertyAsync(Properties.User.DisplayName);
}
private static String GetUserDisplayName2(Windows.System.User user)
{
    // using the old GetPropertyAsync that takes a string
    return await
user.GetPropertyAsync(Properties.User.DisplayName.ToString( );
}
private static String GetUserDisplayName3(Windows.System.User user)
{
    PropertyKey[ ] requesetedProps=new PropertyKey[ ] {
    Properties.User.FirstName,
    Properties.User.LastName,
    Properties.User.ProviderName,
    Properties.User.AccountName,
    Properties.User.PrincipalName,
    Properties.User.DisplayName,
    Properties.User.DomainName};
    PropertySet properties=await
user.GetPropertiesAsync(requesetedProps);
    return properties[Properties.User.DisplayName];
}
private static PropertySet GetNameProperties(Windows.System.User user)
{
    PropertyKey[ ] requesetedProps=new PropertyKey[ ] {
    Properties.User.FirstName,
    Properties.User.LastName,
    Properties.User.ProviderName,
    Properties.User.AccountName,
    Properties.User.PrincipalName,
    Properties.User.DisplayName,
    Properties.User.DomainName};
    return await user.GetPropertiesAsync(requesetedProps);
}
    The following provide examples of using PropertySelector with the Windows.System.User class to filter users.
using Windows. System;
using Windows. Foundation;
using Windows. Foundation. Collections;
static User[ ] FindDomainUsers(String Domain)
{
    User[ ] result=new User[ ] { };
    PropertySelector
selector=PropertySelector.CreateFromExpression(
        new PropertyExpression(
            Properties.User.DomainName,
            PropertyOperator.Equals,
            PropertyValue.CreateString(Domain)));
    IReadOnlyList<User>users=await User.FindAllAsync(
    UserType.RemoteUser,
    UserAuthenticationStatus.RemotelyAuthenticated);
    foreach (User user in users)
    {
        String[ ] desiredProperties=new String[ ] {
            KnownUserProperties.FirstName,
            KnownUserProperties.LastName,
            KnownUserProperties.ProviderName,
            KnownUserProperties.AccountName,
            KnownUserProperties.GuestHost,
            KnownUserProperties.PrincipalName,
            KnownUserProperties.DomainName,
            KnownUserProperties.SessionInitiationProtocolUri};
        IPropertySet values=await user.GetPropertiesAsync(desiredProperties);
        if      (selector.Evaluate(values)==PropertySelectorResult.True)
        {
            result+=user;
        }
    }
    return result;
    The following an example of an interface definition.
// from Windows.Foundation.Properties.idl, everything is new
import "oaidl.idl";
import "Windows.Foundation.idl";
#include <sdkddkver.h>
namespace Windows. Foundation
{
    declare
    {
    interface
Windows. Foundation. TypedEventHandler<Windows. Foundation. PropertySelector*, IInspectable*>;
    }
    [contract(Windows.Foundation.UniversalApiContract, 7)]
    runtimeclass PropertyKey: IStringable
    {
        PropertyKey(Guid propertyNamespace, UInt32 propertyId, PropertyType type);
        PropertyKey(String wellKnownProperty);
        Guid Namespace{get;};
        UInt32 Id{get;};
        PropertyType Type{get;};
    }
    [contract(Windows.Foundation.UniversalApiContract, 7)]
    enum PropertyOperator
    {
        // operator modifiers
        NotModifer=0x00010000,
        IgnoreCaseModifier=0x00020000,
        // comparison operators
        None=0x00000000,
        Exists=0x00000001,
        NotExists=Exisits|NotModifer,
        Equals=0x00000002,
        NotEquals=Equals|NotModifer,
        GreaterThan=0x00000003,
        NotGreaterThan=GreaterThan|NotModifer,
        LessThan=0x00000004,
        NotLessThan=LessThan|NotModifer,
        GreaterThanEquals=0x00000005,
        NotGreaterThanEquals=GreaterThanEquals|NotModifer,
        LessThanEquals=0x00000006,
        NotLessThanEquals=LessThanEquals|NotModifer,
        EqualsIgnoreCase=Equals|IgnoreCaseModifier,
        NotEqualsIgnoreCase=Equals|NotModifer|IgnoreCaseModifier,
        BitwiseAnd=0x00000007,
        BitwiseOr=0x00000008,
        BeginsWith=0x00000009,
        BeginsWithIgnoreCase=BeginsWith|IgnoreCaseModifier,
        EndsWith=0x0000000a,
```

```
EndsWithIgnoreCase=EndsWith|IgnoreCaseModifier,
Contains=0x0000000b,
ContainsIgnoreCase=Contains|IgnoreCaseModifier,
// string list operators
ListContains=0x00001000,
ListContainsIgnoreCase=ListContains|IgnoreCase-
    Modifier,
ListElementBeginsWith=0x00002000,
ListElementBeginsWithIgnoreCase=ListElementBeg-
    insWith|IgnoreCaseModifier,
ListElementEndsWith=0x00003000,
ListElementEndsWithIgnoreCase=ListElementEnds-
    With|IgnoreCaseModifier,
ListElementContains=0x00004000,
ListElementContainsIgnoreCase=ListElementContains|-
    IgnoreCaseModifier,
// array operators
ArrayContains=0x10000000,
};
[contract(Windows.Foundation.UniversalApiContract,
7), flags]
    enum PropertyOperatorMask
    {
    ComparisonMask=0x00000FFF,
    ListMask=0x0000F000,
    ModifierMask=0x000F0000,
    ArrayMask=0xF0000000
    };
[contract(Windows.Foundation.UniversalApiContract,
7)]
    runtimeclass PropertyExpression
    {
    PropertyExpression(PropertyKey propertyKey, Property-
        Operator propertyOperator, IPropertyValue property-
        Value);
    PropertyKey Key{get;};
    PropertyOperator Operator{get;};
    IPropertyValue Value{get;};
    }
[contract(Windows.Foundation.UniversalApiContract,
7)]
    enum PropertySelectorEvaluateResult
    {
    Inconclusive=0,
    True,
    False
    };
[contract(Windows.Foundation.UniversalApiContract,
7)]
    runtimeclass PropertySelector: IStringable
    {
    static PropertySelector CreateFromExpression(Property-
        Expression expression);
    static  PropertySelector  CreateWithAnd(Windows.
        Foundation.Collections.IIterable<PropertyExpress-
        ion>expressions);
    static PropertySelector CreateWithOr (Windows. Foun-
        dation.  Collections.  IIterable<Property
        Expression>expressions);
    static PropertySelector CreateFromAqsSelector(String
        aqsSelector);
    void AndExpression(PropertyExpression expression);
    void
AndExpressions (Windows. Foundation. Collections.
IIterable<PropertyExpression>expressions);
    void AndSelector(PropertySelector selector);
    void
AndSelectors  (Windows.  Foundation.  Collections.
IIterable<PropertySelector>selectors);
    void OrExpression(PropertyExpression expression);
    void
OrExpressions  (Windows.  Foundation.  Collections.
IIterable<PropertyExpression>expressions);
    void OrSelector(PropertySelector selector);
    void
OrSelectors  (Windows.  Foundation.  Collections.
IIterable<PropertySelector>selectors);
    void Negate( )
    //event       TypedEventHandler<PropertySelector,
        PropertyKey>GetProperty;
    PropertySelectorEvaluateResult
Evaluate(Windows.Foundation.Collections.PropertySet
propertySet);
    }
{
namespace Windows. Foundation. Properties
{;
    [contract(Windows.Foundation.UniversalApiContract,
7)]
    runtimeclass DeviceProperties
    {
    Windows.Foundation.PropertyKey FriendlyName{get;};
    Windows.Foundation.PropertyKey
        DeviceManufacturer{get;};
    Windows.Foundation.PropertyKey Manufacturer{get;};
    Windows.Foundation.PropertyKey ModelName{get;};
    Windows.Foundation.PropertyKey ModelNumber{get;};
    Windows.Foundation.PropertyKey       PresentationUrl
        {get;};
    Windows.Foundation.PropertyKey IpAddress{get;};
    Windows.Foundation.PropertyKey       ServiceAddress
        {get;};
    Windows.Foundation.PropertyKey ServiceId{get;};
    Windows.Foundation.PropertyKey
        DiscoveryMethod{get;};
    Windows.Foundation.PropertyKey Paired{get;};
    Windows.Foundation.PropertyKey Icon{get;};
    Windows.Foundation.PropertyKey LocalMachine{get;};
    Windows.Foundation.PropertyKey MetadataPath{get;};
    Windows.Foundation.PropertyKey
        LaunchDeviceStageFromExplorer{get;
};
    // . . .
    }
// Windows.Foundation.PropertyKeys.Devices.AepProper-
tyKeys
// Windows.Foundation.PropertyKeys.Devices.DeviceProp-
ertyKeys
//    Windows.Foundation.PropertyKeys.User.UserProper-
tyKeys
//     Windows.   Foundation.   PropertyKeys.{Root-
Namespace}.{TypeName}PropertyKeys
namespace Device
{
    [contract(Windows.Foundation.UniversalApiContract,
7)]
    runtimeclass AepProperties
    {
    Windows.Foundation.PropertyKey AepId{get;};
    Windows.Foundation.PropertyKey Category{get;};
    Windows.Foundation.PropertyKey ContainerId{get;};
    Windows.Foundation.PropertyKey DeviceAddress{get;};
    Windows.Foundation.PropertyKey CanPair{get;};
    Windows.Foundation.PropertyKey IsConnected{get;};
```

```
        Windows.Foundation.PropertyKey IsPresent{get;};
        Windows.Foundation.PropertyKey Manufacturer{get;};
        Windows.Foundation.PropertyKey ModelId{get;};
        Windows.Foundation.PropertyKey ModelName{get;};
        Windows.Foundation.PropertyKey ProtocolId{get;};
        Windows.Foundation.PropertyKey SignalStrength{get;};
        // . . .
        }
    {
    namespace Multimedia
    {
        [contract(Windows.Foundation.UniversalApiContract,
    7)]
        runtimeclass AudioProperties
        {
        Windows.Foundation.PropertyKey ChannelCount{get;};
        // . . .
        }
    }
        [contract(Windows.Foundation.UniversalApiContract,
    7)]
        runtimeclass UserProperties
        {
        Windows.Foundation.PropertyKey AccountName{get;};
        Windows.Foundation.PropertyKey DisplayName{get;};
        Windows.Foundation.PropertyKey DomainName{get;};
        Windows.Foundation.PropertyKey FirstName{get;};
        Windows.Foundation.PropertyKey GuestHost{get;};
        Windows.Foundation.PropertyKey LastName{get;};
        Windows.Foundation.PropertyKey PrincipalName{get;};
        Windows.Foundation.PropertyKey ProviderName{get;};
        Windows.Foundation.PropertyKey
            SessionInitiationProtocolUri{get;
    };
        {
        }
    ///////////// from Windows.Foundation.idl, new sections high-
    lighted.
        namespace Collections {
        [contract(Windows.Foundation.FoundationContract, 1)]
        [version(NTDDI_WIN8),      uuid(8a43ed9f-f4e6-4421-
            acf9-1dab2986820c), hasvariant]
        [version(NTDDI_WIN8, Platform.WindowsPhone)]
        interface    IPropertySet:   IInspectable   requires
            IObservableMap<HSTRING, IInspectable*>
        {
            // No methods, this is only a "tag" interface to indicate
                Property Set implementations
        }
        [contract(Windows.Foundation.FoundationContract, 3)]
        [uuid(e1ea778e-18ea-47b6-af26-e9c88635f177)]
        interface    IPropertySet2:   IInspectable   requires
            IObservableMap<IInspectable*, IInspectable*>
        {
            // No methods, this is only a "tag" interface to indicate
                Property Set implementations
        }
        [activatable(NTDDI_WIN8),
            activatable(NTDDI_WIN8, Platform.WindowsPhone),
            version(NTDDI_WIN8),
            version(NTDDI_WIN8, Platform.WindowsPhone)]
        [contract(Windows.Foundation.FoundationContract, 1)]
        [activatable(Windows. Foundation. FoundationContract,
            1)]
        [dualapipartition(NTDDI_WIN8)]
        [threading(both)]
        [marshaling_behavior(agile)]
```

```
        runtimeclass PropertySet
        {
            [default] interface IPropertySet;
            //[contract(Windows.Foundation.FoundationContract,
                3)]
            //interface IPropertySet2;
        }
        [activatable(NTDDI_WINBLUE,     Platform.Windows-
            Phone),
            activatable(NTDDI_WINTHRESHOLD),
            activatable(Windows.Foundation.FoundationContract,
                1),
            version(NTDDI_WINBLUE,      Platform.Windows-
                Phone),
            version(NTDDI_WINTHRESHOLD)]
        [contract(Windows.Foundation.FoundationContract, 1)]
        [dualapipartition(NTDDI_WINTHRESHOLD)]
        [threading(both)]
        [marshaling_behavior(agile)]
        runtimeclass ValueSet
        {
            [default] interface IPropertySet;
            //[contract(Windows.Foundation.FoundationContract,
                3)]
            //interface IPropertySet2;
        }
```

Figure 2:
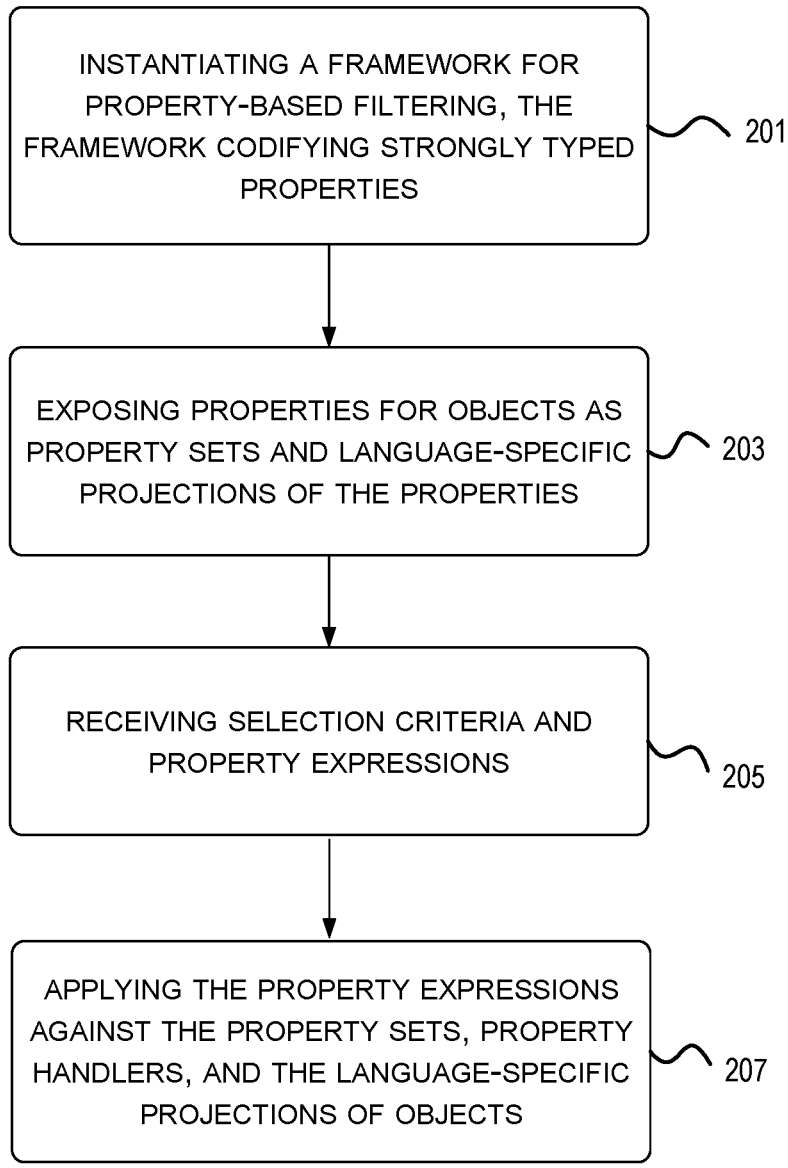
FIG. 2 illustrates aspects of an operational procedure for enabling aspects of the techniques disclosed herein as shown and described below.

FIG. 2 illustrates aspects of a routine 200 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 200 may be also implemented in many other ways. For example, the routine 200 may be implemented, at least in part, by a processor of another remote computer or a local circuit. In addition, one or more of the operations of the routine 300 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
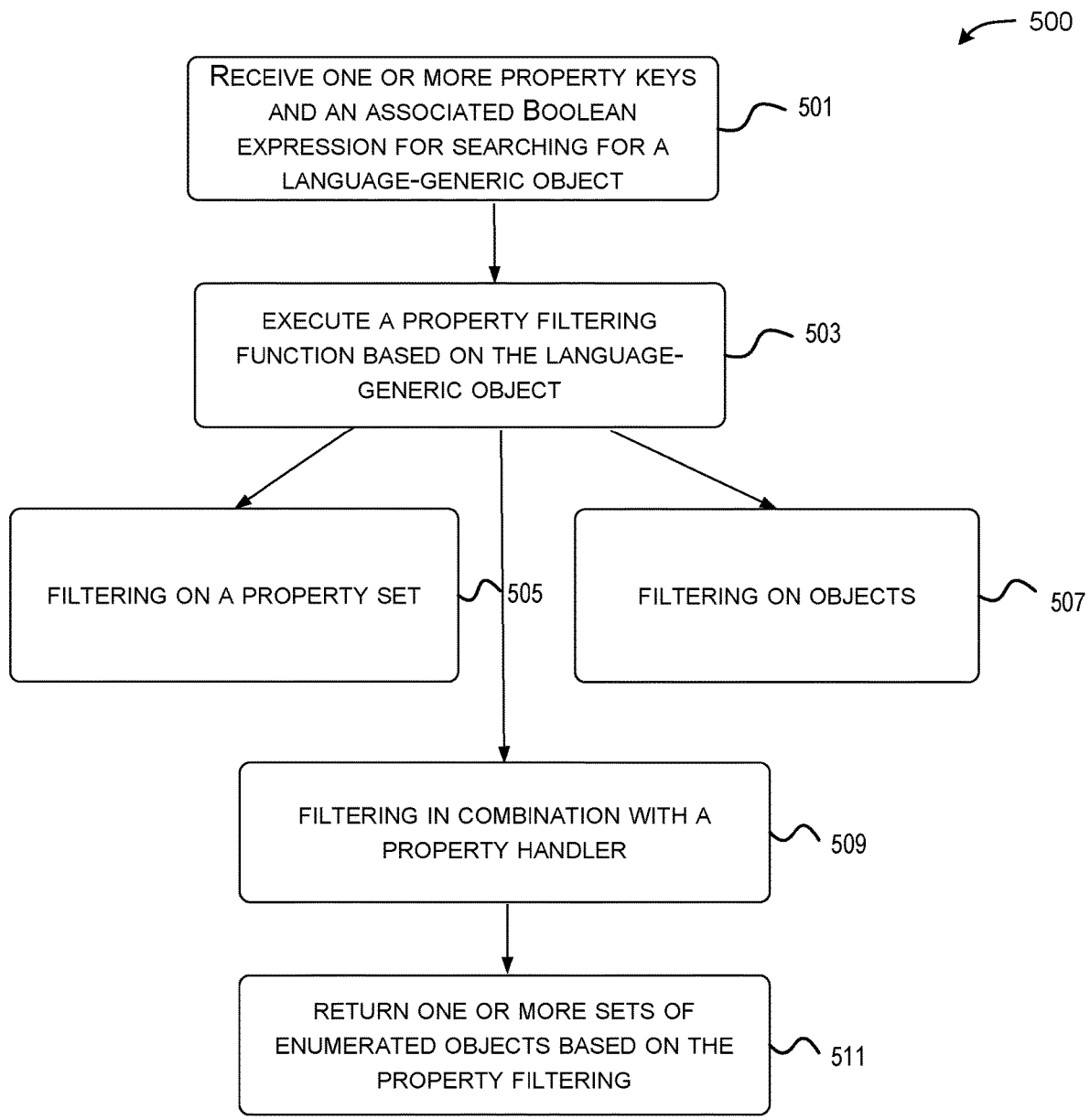
FIG. 5 illustrates aspects of an operational procedure for enabling aspects of the techniques disclosed herein as shown and described below.
Figure 6:
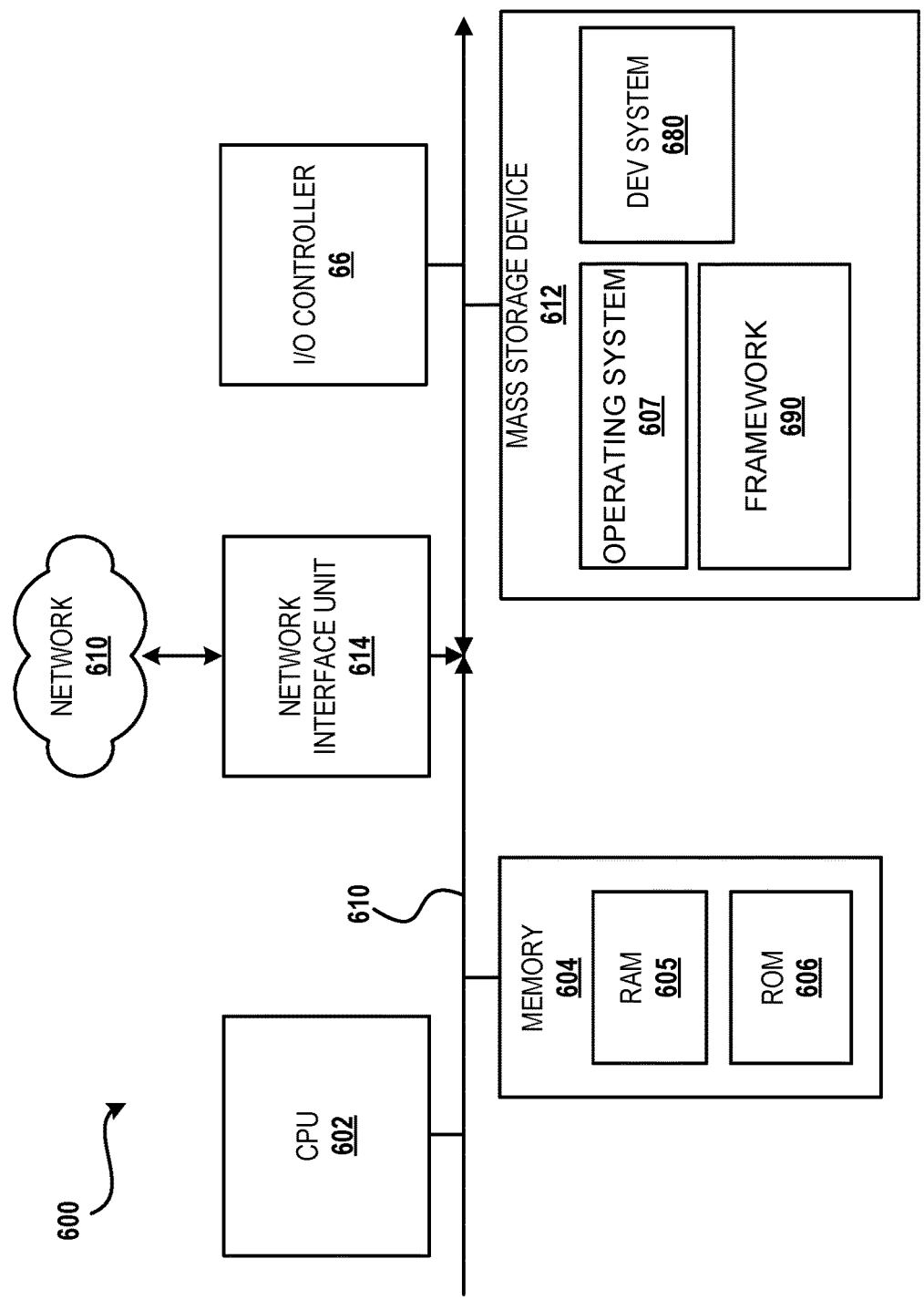
FIG. 6 is a computer architecture diagram illustrating an illustrative computer hardware and software architecture for a computing system capable of implementing aspects of the techniques and technologies presented herein.

The operations in FIG. 2 can be performed, for example, by the computing device 600 of FIG. 6, as described above with respect to any one of FIGS. 1-5.

At operation 201, a framework for property-based filtering is instantiated, the framework codifying strongly typed properties.

At operation 203, properties for objects as property sets and language-specific projections of the properties are exposed.

At operation 205, selection criteria and property expressions are received.

At operation 207, the property expressions is applied against the property sets, property handlers, and the language-specific projections of objects.

With reference to FIG. 2, in an embodiment:
*Property Sets*
Prop_key={id, (opt) type}
Prop_val={type, val}
Property={key, val}
Property_set=collection<property>
How to create:
   Property_set set=new collection<property>{data};
   Set=object.As(IPropertySet); (<=what this looks like depends on the language projection)
*property handler*
Handler=interface {get_prop(key, [out] property)}
   How to create:
   App developer writes a class to implement that interface
   Handler h=object.As(IPropertyHandler)
*filter*
Eval_op=[==, !=, < . . . ]
Logical_exp={key, op, value}
Logical_exp_set=collection<logical_exp>
Lofical_op=[and, or, not, xor]
Filter={logical_op, logical_exp_set|
Filter={filter, logical_op, filter}
How to create:
   Filter f=NameSpace::API::GetFilter(filter params);
   Developer builds filter
     F=(new filter(op, set), op, some_other_filter)<=eg
   In the future, it could look like:
     f=(f1 && f2)||f3

Developer flow:
*Post filter flow*
1. get data as in set of objects, or property sets
2. get or make filter
3. for each (obj: obj set) if filter.eval(obj)==←match
*pre filter flow*
1. get|make filter
2. opt. make handler
3. filtered_set=api->get_objs(filter, opt, handler, params,);

In a device space, some properties can be composited or synthesized from other properties or even other objects within the object model.

Some embodiments include the implementation of a device tree with device nodes objects. Device nodes can have interface objects that define what can be done with it. Physical devices may be grouped together into device containers which are a collection of device nodes that belong to the physical device.

In one example, a multi-function printer as the physical device may have a tree showing how it is connected to the PC. A host controller may comprise a USB root hub with a number of ports, including a USB composite device which may be two printers. The USB composite device may further have additional nodes.

In another example, objects may be viewed by device containers. The top-level item may be the device container, followed by a number of devnodes that are in the container, and below the devnodes there can be interface objects that define capabilities to print, scan, and fax by the devnodes. Each one of these objects in this hierarchy may have property bags. Some of the properties may be placed directly on the objects, while some properties may be generated by heuristics through examining related objects. For example, an IsConnected property may be derived from the parent. The children's IsConnected property may be derived from the root node, and the children may not have their own property. Friendly Display Name may be a property that has a heuristic to find the best friendly name.

If a devnode is checked, the devnode may have some useful properties such as device description, display name, bus reported device description, and driver description. If these properties are not available, the container can be checked and its friendly name can be used (e.g., "display name=Name Model").

If the name of one of the interfaces is requested, the interface may have its own properties that can be used to generate it, or it may check the parent devnode or container. If the interface is a well-known class, then the class can be used.

When an object can be represented by strongly typed properties, these properties have a strong identity that can define a heuristic for generating meta properties. A heuristic could be, for example, for INTERFACE_PROP_FOO, query devnode may be defined in the interface's property INTERFACE_PROP_PARENT, and the value from DEVNODE_PROP_FOO may be used. This method can be used in some simple cases, and the framework can provide helper implementations to facilitate this.

Auto prop=MetaProperty::UseParent(PARENT_ID_PROP, PARENT_VAL_TO_USE));
   Property Set->Add(prop);
   Auto vat=PropertySet[prop]->Value;

The framework may be configured to automatically traverse the relationship and fetch the right property, which may be advantageous because developer searches can be complex and may require additional code.

In more complex examples, the heuristic may involve more complex logic, where a developer may implement an abstraction of the meta property and store it in a strongly typed property.

An example where this may be used is to determine if a Bluetooth device is connected. The Bluetooth stack may expose a meta property, backed with the stack's implementation for accessing the Bluetooth stack to determine this information.

In some embodiments, meta properties may be used in conjunction with the disclosed techniques, with simply accessed property sets that can be used in filters. Other flows can use the property sets and filters, and the strongly typed property object may handle running the heuristic when needed.

Figure 3:
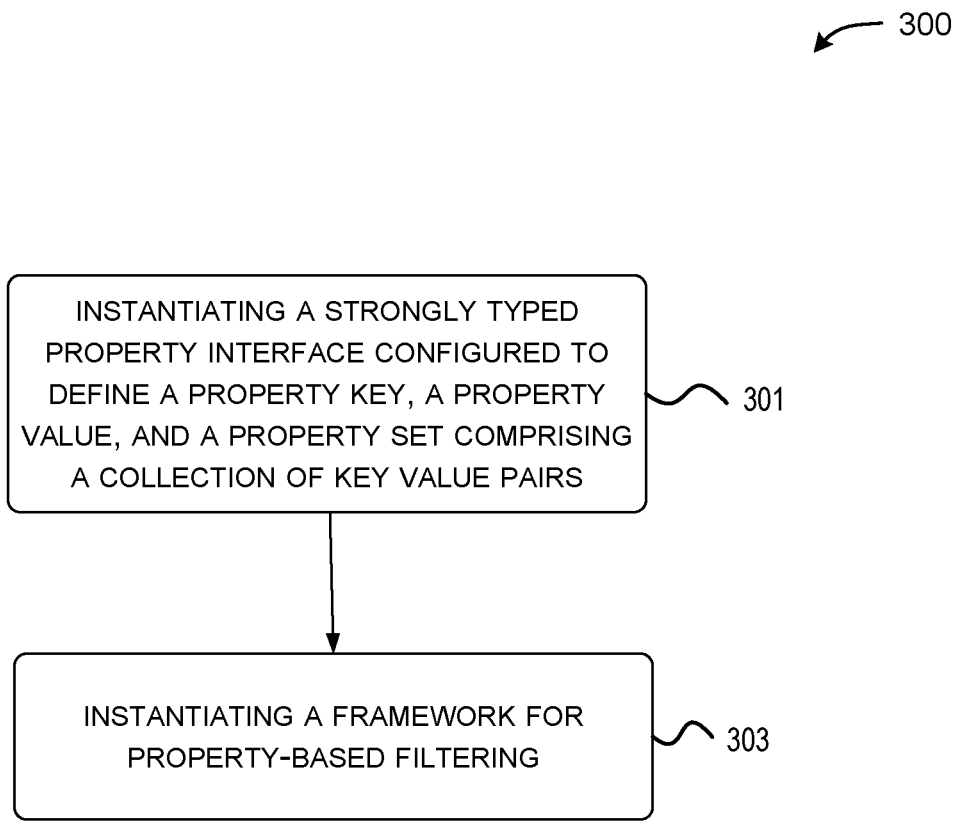
FIG. 3 illustrates aspects of an operational procedure for enabling aspects of the techniques disclosed herein as shown and described below.

FIG. 3 illustrates aspects of a routine 300 for enabling aspects of the techniques disclosed herein as shown and described below. At operation 301, a strongly typed property interface is instantiated that is configured to define a property key, a property value, and a property set comprising a collection of key value pairs. The property interface may be implemented as an application programming interface or other user interface that is configured to receive a property key, a property value, a property set, and other data that can be used for property filtering.

At operation 303, a framework is instantiated for property-based filtering. In an embodiment, the framework is configured to codify filters as logical expressions that evaluate on a given property set as true, false, or ambiguous.

Figure 4A:
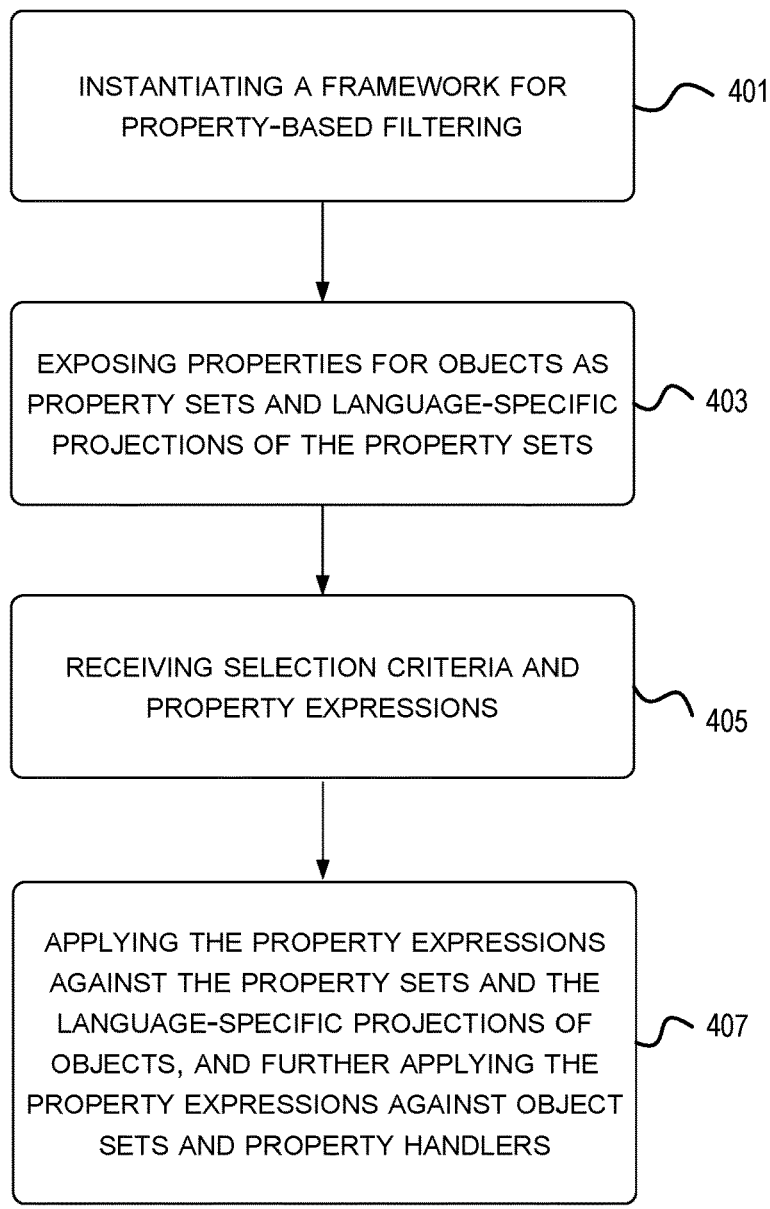
FIG. 4A illustrates aspects of an operational procedure for enabling aspects of the techniques disclosed herein as shown and described below.

FIG. 4A illustrates aspects of a routine 400A for enabling aspects of the techniques disclosed herein as shown and described below. At operation 401, a framework for property-based filtering is instantiated.

At operation 403, properties for objects are exposed as property sets and language-specific projections of the property sets.

At operation 405, selection criteria and property expressions are received.

At operation 407, the property expressions are applied against the property sets, the language-specific projections of objects, object sets, and property handlers.

Figure 4B:
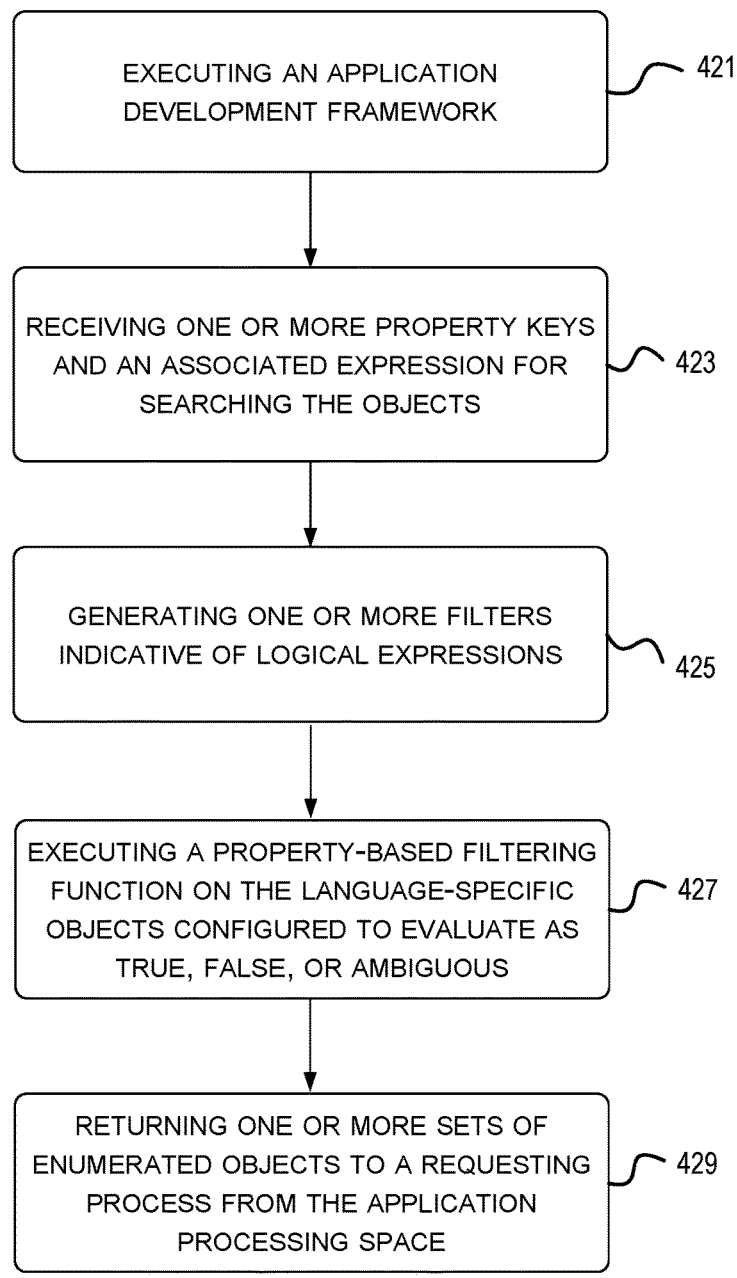
FIG. 4B illustrates aspects of an operational procedure for enabling aspects of the techniques disclosed herein as shown and described below.

FIG. 4B illustrates aspects of a routine 400B for enabling aspects of the techniques disclosed herein as shown and described below. At operation 421, an application development framework is executed. In an embodiment, the application development framework is configured to implement a strongly typed runtime class comprising property sets for defining objects via a programming interface. The objects may comprise files or peripherals in some embodiments. In an embodiment, the application development framework is configured to project the property sets on language-specific objects associated with a programming language supported by the application development framework.

At operation 423, one or more property keys and an associated expression for searching the objects is received by the application development framework from an application processing space.

At operation 425, one or more filters indicative of logical expressions is generated based on the received property keys and associated expressions.

At operation 427, a property-based filtering function configured to evaluate as true, false, or ambiguous is executed on the language-specific objects based on the one or more filters.

At operation 429, one or more sets of enumerated objects is returned to a requesting process from the application processing space based on results of the property-based filtering function.

Figure 4C:
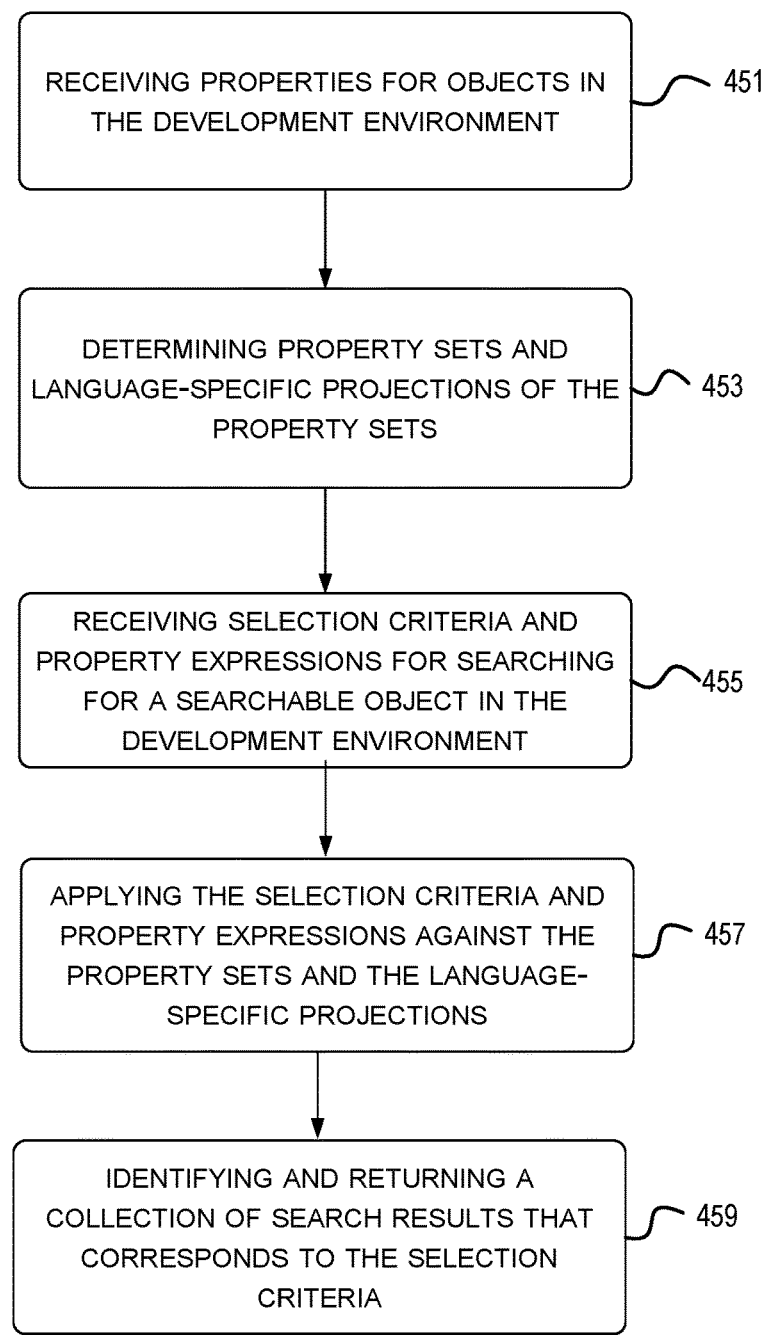
FIG. 4C illustrates aspects of an operational procedure for enabling aspects of the techniques disclosed herein as shown and described below.

FIG. 4C illustrates aspects of a routine 400C for enabling aspects of the techniques disclosed herein as shown and described below. At operation 451, properties for objects in the development environment are received. In an embodiment, the properties are implemented as a strongly typed runtime class for defining searchable objects.

At operation 453, based on the properties for the objects, property sets and projecting language-specific projections of the property sets are determined.

At operation 455, selection criteria and property expressions for searching for a searchable object in the development environment are received from an executing application.

At operation 457, the selection criteria and property expressions are applied against the property sets and the language-specific projections.

At operation 459, based on the applying, a collection of search results that corresponds to the selection criteria are identified and returned to an application process of the executing application.

FIG. 5 illustrates aspects of a routine 500 for enabling aspects of the techniques disclosed herein as shown and described below. At operation 501, one or more property keys and an associated Boolean expression are received, via an application programming interface, for searching for a language-generic object. At operation 503, a property filtering function based on the language-generic object is executed. In an embodiment, the property filtering is configured to search language-specific properties and property sets that are based on language-generic objects defined by a strongly typed runtime class.

At operation 505, filtering comprises filtering on a property set.

At operation 507, filtering comprises filtering on objects.

At operation 509, filtering comprises filtering in combination with a property handler.

At operation 511, one or more sets of enumerated objects based on the property filtering are returned via the application programming interface.

FIG. 6 shows additional details of an example computer architecture 600 for a computer capable of executing the program components described herein. Thus, the computer architecture 600 illustrated in FIG. 6 illustrates an architecture for a server computer, a desktop computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 606, and a system bus 610 that couples the memory 604 to the CPU 602. A basic input/output system containing the basic routines that help to transfer information between elements within the computer architecture 600, such as during startup, is stored in the ROM 606. The computer architecture 600 further includes a mass storage device 612 for storing an operating system 607. Mass storage device 612 may further include framework 690 and development system 680, which include some or all of the aspects of chunk visualization functionality as disclosed herein and chunk management functionality as disclosed herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 610 and/or another network (not shown). The computer architecture 600 may connect to the network 610 through a network interface unit 614 connected to the bus 610. It should be appreciated that the network interface unit 614 also may be utilized to connect to other types of networks and remote computer systems. The computer architecture 600 also may include an input/output controller 66 for receiving and processing input from a number of other devices, including a keyboard, mouse, or electronic stylus (not shown in FIG. 6). Similarly, the input/output controller 66 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the claims, which may include at least some of the aspects described herein.

EXAMPLE CLAUSES

The disclosure presented herein encompasses the subject matter set forth in the following example clauses.

Example Clause A, a method for implementing searchable objects in an application development framework, the method comprising:
executing an application development framework configured to:
implement a strongly typed runtime class comprising property sets for defining objects via a programming interface, the objects comprising files or peripherals; and
project the property sets on language-specific objects associated with a programming language supported by the application development framework;
receiving, by the application development framework from an application processing space, one or more property keys and an associated expression for searching the objects;
generating one or more filters indicative of logical expressions based on the received property keys and associated expressions;
executing, based on the one or more filters, a property-based filtering function on the language-specific objects configured to evaluate as true, false, or ambiguous; and
based on results of the property-based filtering function, returning one or more sets of enumerated objects to a requesting process from the application processing space.

Example Clause B, the method of Example Clause A, further comprising implementing a prefilter configured to constrain the returned sets of enumerated objects.

Example Clause C, the method of any one of Example Clauses A through B, wherein the runtime class comprises a namespace GUID, property ID, and property type.

Example Clause D, the method of any one of Example Clauses A through C, wherein the strongly typed runtime classes are used to represent properties with static accessors.

Example Clause E, the method of any one of Example Clauses A through D, wherein the prefilter is implemented in an application programming interface (API) that implements the filters, receives a canonical string, and returns a property key object.

Example Clause F, the method of any one of Example Clauses A through E, wherein the strongly typed runtime classes are defined in part by enumerated types.

Example Clause G, the method of any one of Example Clauses A through F, further comprising implementing a postfilter configured to be executed on one or more of property sets, objects that expose property sets, property get handlers, or properties exposed through objects provided by object APIs and exposed by projection.

Example Clause H, the method of any one of Example Clauses A through G, further comprising receiving a property type, wherein the one or more filters are further based on the property type.

Example Clause I, a method for implementing a framework for property-based filtering in a development environment, the method comprising:
receiving properties for objects in the development environment, the properties implemented as a strongly typed runtime class for defining searchable objects;
based on the properties for the objects, determining property sets and projecting language-specific projections of the property sets;
receiving, from an executing application, selection criteria and property expressions for searching for a searchable object in the development environment;
applying the selection criteria and property expressions against the property sets and the language-specific projections; and
based on the applying, identifying and returning a collection of search results that corresponds to the selection criteria to an application process of the executing application.

Example Clause J, the method of Example I, further comprising instantiating an application programming interface (API) configured to generate a filter object usable to request a collection of search results and execute a filter against the search results, wherein the API is configured to perform prefiltering by receiving the filter and using the filter to cull the search results before returning data via the API.

Example Clause K, the method of any one of Example Clauses I through J, wherein the strongly typed runtime classes are used to represent properties with static accessors.

Example Clause L, the method of any one of Example Clauses I through K, wherein the framework is configured to codify filters as logical expressions that evaluate on a given property set as true, false, or ambiguous.

Example Clause M, the method of any one of Example Clauses I through L, wherein the property expressions are further applied against property handlers.

Example Clause N, a system comprising a processor and memory storing instructions that, when executed by the processor, configure the system to instantiate a software development framework configured to:

receive, via an application programming interface, one or more property keys, and an associated Boolean expression for searching for a language-generic object;

execute a property filtering function based on the language-generic object, the property filtering configured to search language-specific properties and property sets that are based on language-generic objects defined by a strongly typed runtime class, wherein the property filtering comprises one or more of:

filtering on a property set;
filtering on objects; and
filtering in combination with a property handler; and return one or more sets of enumerated objects, via the application programming interface, based on the property filtering.

Example Clause O, the system of Example Clause N, further comprising instructions that, when executed by the processor, configure the system to instantiate one or more APIs configured to publish interfaces that are projected for the property set, property handler, and execution of one or more filters.

Example Clause P, the system of any of Example Clauses O through N, wherein the one or more APIs are configured to receive an object definition, wherein when the object definition defines generic object properties, the generic object properties projected as a property set that is filterable.

Example Clause Q, the system of any one of Example Clauses O through P, wherein the one or more APIs are configured to return a collection of property expressions that are usable to generate a filter based on the projected property set.

Example Clause R, the system of any one of Example Clauses O through Q, wherein the one or more APIs are configured to use the filter to constrain results returned by the one or more APIs.

Example Clause S, the system of any one of Example Clauses O through R, wherein the property set comprises a collection of key value pairs.

Example Clause T, the system of any one of Example Clauses O through S, wherein the software development framework is configured to codify filters as logical expressions that evaluate on a given property set as true, false, or ambiguous.

What is claimed is:

1. A method for implementing searchable objects in an application development framework, the method comprising:

executing an application development framework configured to:
implement a strongly typed runtime class comprising property sets for defining objects via a programming interface, the objects comprising files or peripherals; and
project the property sets on language-specific objects associated with a programming language supported by the application development framework;
receiving, by the application development framework from an application processing space, one or more property keys and an associated expression for searching the objects;
generating one or more filters indicative of logical expressions based on the received property keys and associated expressions;
executing, based on the one or more filters, a property-based filtering function on the language-specific objects configured to evaluate as true, false, or ambiguous; and
based on results of the property-based filtering function, returning one or more sets of enumerated objects to a requesting process from the application processing space.

2. The method of claim 1, further comprising implementing a prefilter configured to constrain the returned sets of enumerated objects.

3. The method of claim 1, wherein the runtime class comprises a namespace GUID, property ID, and property type.

4. The method of claim 1, wherein the strongly typed runtime classes are used to represent properties with static accessors.

5. The method of claim 2, wherein the prefilter is implemented in an application programming interface (API) that implements the filters, receives a canonical string, and returns a property key object.

6. The method of claim 1, wherein the strongly typed runtime classes are defined in part by enumerated types.

7. The method of claim 1, further comprising implementing a postfilter configured to be executed on one or more of property sets, objects that expose property sets, property get handlers, or properties exposed through objects provided by object APIs and exposed by projection.

8. The method of claim 1, further comprising receiving a property type, wherein the one or more filters are further based on the property type.

9. A method for implementing a framework for property-based filtering in a development environment, the method comprising:

receiving properties for objects in the development environment, the properties implemented as a strongly typed runtime class for defining searchable objects;
based on the properties for the objects, determining property sets and projecting language-specific projections of the property sets;
receiving, from an executing application, selection criteria and property expressions for searching for a searchable object in the development environment;
applying the selection criteria and property expressions against the property sets and the language-specific projections; and
based on the applying, identifying and returning a collection of search results that corresponds to the selection criteria to an application process of the executing application.

10. The method of claim 9, further comprising instantiating an application programming interface (API) configured to generate a filter object usable to request a collection of search results and execute a filter against the search results, wherein the API is configured to perform prefiltering by receiving the filter and using the filter to cull the search results before returning data via the API.

11. The method of claim 9, wherein the strongly typed runtime classes are used to represent properties with static accessors.

12. The method of claim 9, wherein the framework is configured to codify filters as logical expressions that evaluate on a given property set as true, false, or ambiguous.

13. The method of claim 9, wherein the property expressions are further applied against property handlers.

14. A system comprising a processor and memory storing instructions that, when executed by the processor, configure the system to instantiate a software development framework configured to:
 receive, via an application programming interface, one or more property keys, and an associated Boolean expression for searching for a language-generic object;
 execute a property filtering function based on the language-generic object, the property filtering configured to search language-specific properties and property sets that are based on language-generic objects defined by a strongly typed runtime class, wherein the property filtering comprises one or more of:
  filtering on a property set;
  filtering on objects; and
  filtering in combination with a property handler; and
 return one or more sets of enumerated objects, via the application programming interface, based on the property filtering.

15. The system of claim 14, further comprising instructions that, when executed by the processor, configure the system to instantiate one or more APIs configured to publish interfaces that are projected for the property set, property handler, and execution of one or more filters.

16. The system of claim 15, wherein the one or more APIs are configured to receive an object definition, wherein when the object definition defines generic object properties, the generic object properties projected as a property set that is filterable.

17. The system of claim 16, wherein the one or more APIs are configured to return a collection of property expressions that are usable to generate a filter based on the projected property set.

18. The system of claim 17, wherein the one or more APIs are configured to use the filter to constrain results returned by the one or more APIs.

19. The system of claim 14, wherein the property set comprises a collection of key value pairs.

20. The system of claim 14, wherein the software development framework is configured to codify filters as logical expressions that evaluate on a given property set as true, false, or ambiguous.

* * * * *